Patented Feb. 17, 1931

1,792,819

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

ACCELERATOR OF VULCANIZATION

No Drawing.  Application filed October 5, 1929. Serial No. 397,751.

This invention relates to the treatment of rubber and it has particular relation to methods of vulcanizing that material and to a composition of matter produced thereby.

One object of the invention is to provide a novel method of curing rubber in which complete vulcanization is secured within a relatively short period of time and at a comparatively low temperature.

Another object of the invention is to provide vulcanized rubber compositions having relatively high tensile strength, elasticity and durability.

Heretofore, in the vulcanization of rubber it has been customary to incorporate small quantities of certain organic compounds, such as diphenyl-guanidine, mercaptobenzothiazole and aldehyde amine reaction products into the rubber compound for the purpose of securing a more rapid rate of cure at a lower temperature than would otherwise be possible. It has been observed that, by employing these organic compounds for purpose of accelerating the vulcanization of the rubber, stronger, more elastic and more durable products are obtained.

This invention consists in the discovery that cyclo hexyl amine derivatives of certain aldehydes, particularly the open chain aldehydes, either saturated or unsaturated, are also valuable accelerators of vulcanization, the use of which results in rapid cures at low temperatures and a product having high tensile strength and elasticity. The rubber obtained also resists the attacks of oxygen, light and other weathering agencies exceptionally well. Although substantially any of the open chain aldehydes may be caused to react with cyclo hexyl amine to form vulcanization accelerators, the following are specific examples of such aldehydes which have been found by actual test to be highly efficient for this purpose: aldol, butyr aldehyde, croton aldehyde, heptaldehyde, acetaldehyde and formaldehyde.

Condensation of any of these aldehydes with cyclo hexyl amine may conveniently be accomplished by adding the aldehyde slowly to the amine without the use of any solvent. Since considerable heat is generated by the reaction, it is desirable sufficiently to cool the mixture to prevent undue loss of aldehyde from evaporation. After the reaction is complete, the resultant product should be heated in order to drive off any water which may be contained therein. During this process a certain degree of turbidity will be observed in the reaction product so long as any appreciable amount of water is present. However, upon the complete evaporation of the water, the compound becomes substantially clear.

The above described reaction may also be effected by incorporating the aldehyde and the amine into a suitable solvent such as alcohol or alcohol and water, and then subjecting the solution to heat under a reflux condenser for several hours. The product obtained by this method may be purified by washing with water which may be removed by decantation or by other convenient mechanical means. After the water has been removed, the product may be dried by exposure to air, vacuum distillation or any other convenient manner.

In order to ascertain the value of the above described reaction products as accelerators of vulcanization, samples thereof were subjected to tests in a compound containing the following ingredients:

| | |
|---|---|
| Extracted rubber | 100 parts |
| Zinc oxide | 5 parts |
| Sulphur | 3 parts |
| Stearic acid | 1.5 parts |
| Accelerator | .5 part |

The samples prepared from this compound in which the hexylamine-aldehyde derivatives were employed as accelerators, were then subjected to physical tests in order to ascertain their tensile strength and their moduli of elasticity. The results of these tests are contained in the appended table, in which the time of cure, temperature of cure, as well as the tensile strength in kgs. per cm$^2$, percentage of stretch and loading in kgs. cm$^2$ at 500 and 700 per cent elongation are indicated in respective columns.

CYCLO HEXYL AMINE+ALDOL

| Cure | | Load in kgs./cm.$^2$ at— | | | Per cent elong. at break |
|---|---|---|---|---|---|
| Time in mins. | Temperature F.° | 500% elong. | 700% elong. | Break | |
| 20 | 260 | 12 | 38 | 120 | 920 |
| 40 | 260 | 21 | 74 | 134 | 800 |
| 80 | 260 | 28 | 112 | 182 | 785 |
| 60 | 285 | 40 | 160 | 174 | 715 |

CYCLO HEXYL AMINE+BUTYR ALDEHYDE

| 20 | 260 | 10 | 23 | 80 | 950 |
| 40 | 260 | 19 | 67 | 136 | 825 |
| 80 | 260 | 30 | 122 | 178 | 760 |
| 60 | 285 | 42 | | 174 | 695 |

CYCLO HEXYL AMINE+CROTON ALDEHYDE

| 20 | 260 | 17 | 56 | 140 | 865 |
| 40 | 260 | 26 | 93 | 166 | 800 |
| 80 | 260 | 36 | 148 | 200 | 755 |
| 60 | 285 | 48 | 203 | 214 | 710 |

CYCLO HEXYL AMINE+HEPTALDEHYDE

| 20 | 260 | 4 | 8 | 26 | 965 |
| 40 | 260 | 13 | 37 | 80 | 865 |
| 80 | 260 | 30 | 115 | 160 | 755 |
| 60 | 285 | 40 | 166 | 186 | 720 |

CYCLO HEXYL AMINE+ACETALDEHYDE

| 20 | 260 | | | | |
| 40 | 260 | 8 | 18 | 54 | 925 |
| 80 | 260 | 15 | 48 | 97 | 825 |
| 60 | 285 | 21 | 75 | 126 | 790 |

CYCLO HEXYL AMINE+FORMALDEHYDE

| 20 | 260 | 8 | | 26 | 970 |
| 40 | 260 | 14 | 13 | 102 | 855 |
| 80 | 260 | 27 | 44 | 172 | 790 |
| 60 | 285 | 59 | 104 | 216 | 680 |

Although the elasticity and tensile strength of the final product varies materially for different aldehydes, it will be observed that all of the compounds tested exhibit considerable power as accelerators, and that certain of them, for example, the reaction products of cyclo hexyl amine and aldol or cyclo hexyl amine and croton aldehyde, are powerful accelerators, the use of which results in products having high tensile strength and elasticity, even when subjected to relatively short periods of cure. Similar samples of rubber which contain no accelerator when subjected to vulcanization for like periods of time are not appreciably vulcanized and have only little more tensile strength and elasticity than the uncured compounds.

Although I have described only the preferred forms of the invention, it will be apparent to those skilled in the art that it is not so limited, but that various modifications may be made therein without departing from the spirit of the invention or from the scope of the appended claims.

What I claim is:

1. A method of curing rubber which comprises subjecting it to heat in the presence of an accelerator containing a reaction product of cyclo hexyl amine and an aldehyde.

2. A method of vulcanizing rubber which comprises subjecting it to cure in the presence of a reaction product of cyclo hexyl amine and an open chain aldehyde.

3. A method of vulcanizing rubber which comprises subjecting it to cure in the presence of a reaction product of cyclo hexyl amine and an aliphatic aldehyde.

4. A method of vulcanizing rubber which comprises subjecting it to cure in the presence of a reaction product of cyclo hexyl amine and an open chain aldehyde containing not more than seven carbon atoms.

5. A method of vulcanizing rubber which comprises subjecting it to cure in the presence of a reaction product of cyclo hexyl amine and a saturated aldehyde containing not more than seven carbon atoms.

6. A method of vulcanizing rubber which comprises subjecting it to cure in the presence of a reaction product of cyclo hexyl amine and an unsaturated aldehyde.

7. A method of vulcanizing rubber which comprises subjecting it to cure in the presence of a reaction product of cyclo hexyl amine and an unsaturated aldehyde containing not more than four carbon atoms.

8. A method of vulcanizing rubber which comprises subjecting it to cure in the presence of an accelerator comprising the reaction product of cyclo hexyl amine and a hydroxy aldehyde.

9. A method of vulcanizing rubber which comprises subjecting it to cure in the presence of an accelerator comprising the reaction product of cyclo hexyl amine and acetaldol.

10. A method of vulcanizing rubber which comprises subjecting it to cure in the presence of a reaction product of cyclo hexyl amine and croton aldehyde.

11. A method of vulcanizing rubber which comprises subjecting it to cure in the presence of a reaction product of cyclo hexyl amine and butyr aldehyde.

12. A method of vulcanizing rubber which comprises subjecting it to cure in the presence of a reaction product of cyclo hexylamine and an aldehyde selected from a group consisting of formaldehyde, heptaldehyde, acetaldehyde and butyraldehyde.

13. A method of vulcanizing rubber which comprises subjecting it to cure in the presence of an accelerator containing a reaction product of cyclo hexyl amine and an aldehyde selected from a group consisting of aldol, butyr aldehyde, croton aldehyde, heptaldehyde, acetaldehyde and formaldehyde.

14. A rubber product that has been vulcanized in the presence of a reaction product of cyclo hexyl amine and an aldehyde.

15. A rubber product that has been vulcanized in the presence of a reaction product of cyclo hexyl amine and an open chain aldehyde.

16. A rubber product that has been vulcanized in the presence of a reaction product of cyclo hexyl amine and a saturated open chain aldehyde.

17. A rubber product that has been vulcanized in the presence of a reaction product of cyclo hexyl amine and an unsaturated open chain aldehyde.

18. A rubber product that has been vulcanized in the presence of a reaction product of cyclo hexyl amine and an aldehyde selected from a group consisting of aldol, butyr aldehyde, croton aldehyde, heptaldehyde, and formaldehyde.

In witness whereof, I have hereunto signed my name.

Signed at Akron, in the county of Summit and State of Ohio, U. S. A., this 4th day of October, 1929.

ALBERT M. CLIFFORD.